United States Patent
Wu et al.

(10) Patent No.: US 9,411,363 B2
(45) Date of Patent: Aug. 9, 2016

(54) SYNCHRONIZATION IN A COMPUTING DEVICE

(71) Applicant: Intel Corporation, Santa Clara, CA (US)

(72) Inventors: Keqiang Wu, San Ramon, CA (US); Jiwei Lu, Pleasanton, CA (US); Yong-Fong Lee, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/565,512

(22) Filed: Dec. 10, 2014

(65) Prior Publication Data

US 2016/0170438 A1      Jun. 16, 2016

(51) Int. Cl.
  G06F 9/46      (2006.01)
  G06F 1/12      (2006.01)
  G06F 9/30      (2006.01)

(52) U.S. Cl.
  CPC .............. G06F 1/12 (2013.01); G06F 9/30065 (2013.01)

(58) Field of Classification Search
  CPC ...................................................... G06F 1/12
  USPC ................................................. 718/101–108
  See application file for complete search history.

(56) References Cited

U.S. PATENT DOCUMENTS

| | | | | |
|---|---|---|---|---|
| 6,115,715 A * | 9/2000 | Traversat | ................. | G06F 9/466 707/703 |
| 6,529,921 B1 * | 3/2003 | Berkowitz | ........ | G06F 17/30578 707/E17.007 |
| 2003/0200212 A1 * | 10/2003 | Benson | .................... | G06F 9/466 |
| 2005/0223275 A1 * | 10/2005 | Jardine | ....................... | G06F 9/52 714/11 |
| 2006/0026411 A1 | 2/2006 | Yoshida | | |
| 2007/0061521 A1 | 3/2007 | Kelly et al. | | |
| 2008/0052498 A1 * | 2/2008 | Stoodley | ................ | G06F 9/3851 712/226 |
| 2010/0257524 A1 | 10/2010 | Weissman et al. | | |
| 2014/0245306 A1 * | 8/2014 | Gathala | ................... | G06F 21/56 718/100 |

OTHER PUBLICATIONS

Anderson, Thomas E. "The performance of spin lock alternatives for shared-money multiprocessors." Parallel and Distributed Systems, IEEE Transactions on 1.1 (1990): pp. 6-16.*
Adl-Tabatabai, Ali-Reza, et al. "Compiler and runtime support for efficient software transactional memory." ACM SIGPLAN Notices. vol. 41. No. 6. ACM, 200, pp. 26-37.*
Chen, Jie, and William Watson III. "Multi-threading performance on commodity multi-core processors." In Proceedings of 9th International Conference on High Performance Computing in Asia Pacific Region (HPC Asia. 2007), pp. 1-8.*

(Continued)

*Primary Examiner* — Satish Rampuria
(74) *Attorney, Agent, or Firm* — Grossman, Tucker, Perreault & Pfleger, PLLC

(57) ABSTRACT

One embodiment provides an apparatus. The apparatus includes a processor, a chipset, a memory to store a process, and logic. The processor includes one or more core(s) and is to execute the process. The logic is to acquire performance monitoring data in response to a platform processor utilization parameter (PUP) greater than a detection utilization threshold (UT), identify a spin loop based, at least in part, on at least one of a detected hot function and/or a detected hot loop, modify the identified spin loop using binary translation to create a modified process portion, and implement redirection from the identified spin loop to the modified process portion.

21 Claims, 3 Drawing Sheets

(56) References Cited

OTHER PUBLICATIONS

International Search Report and Written Opinion received for PCT Application No. PCT/US2015/060610, mailed on Feb. 16, 2016, 10 pages.

Ha, et al.; "Reactive spin-locks: A self-tuning Approach"; Proceedings of the 8th International Symposium on Parallel Architectures, Algorithms and Networks (ISPAN 2005), Dec. 7-9, 2005, 6 pages.

Li, et al.; "Spin Detection Hardware for Improved Management of Multithreaded Systems"; IEEE Transactions on Parallel and Distributed Systems, vol. 17, No. 6, pp. 508-521, Jun. 2006, pp. 508-521.

* cited by examiner

SYNCHRONIZATION IN A COMPUTING DEVICE

FIELD

The present disclosure relates to a computing device, in particular to, synchronization in the computing device.

BACKGROUND

Computing devices such as laptops, tablets and/or smart phones generally include a processor, memory and one or more peripheral devices. The processor may include one or more processing units, e.g., core(s), configured to execute one or more application(s). A process, i.e., an executing application, may include one or more thread(s). The processor may be configured to execute one or more process(es) and/or thread(s) generally in parallel. The process(es) and/or thread(s) may share the processing unit(s) in a time slice fashion, managed by, for example, a scheduler included in an operating system (OS).

The OS (and/or kernel associated with the OS) may be configured to synchronize memory accesses by a plurality of threads to prevent a second thread from accessing a memory location that a first thread has initiated an operation on that has not yet completed. Synchronization is configured to prevent race conditions where results of a read of a memory location depend on execution of order of the plurality of threads. Synchronization is generally implemented by a lock function (e.g., spin lock) configured to ensure that an associated operation is atomic, i.e., the associated operation, once started, completes and commits without another thread accessing the target memory location.

BRIEF DESCRIPTION OF DRAWINGS

Features and advantages of the claimed subject matter will be apparent from the following detailed description of embodiments consistent therewith, which description should be considered with reference to the accompanying drawings, wherein:

Figure 1:
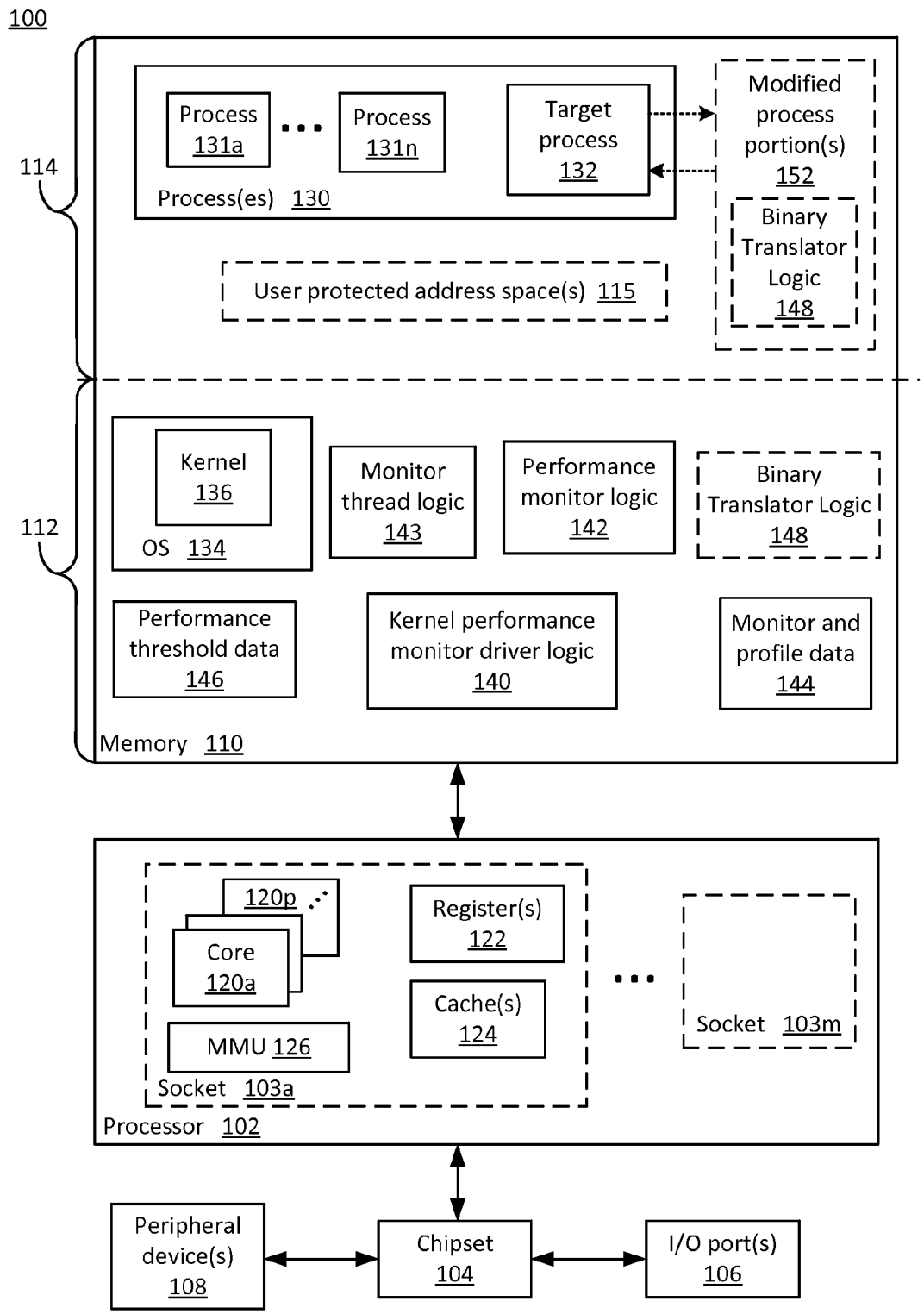
FIG. 1 illustrates a functional block diagram of a computing device consistent with various embodiments of the present disclosure.

Although the following Detailed Description will proceed with reference being made to illustrative embodiments, many alternatives, modifications, and variations thereof will be apparent to those skilled in the art.

DETAILED DESCRIPTION

While a lock associated with a first thread is applied and a second thread is executing, the kernel may cause attempts by the second thread to access the locked memory location to fail. The second thread may execute a spin loop until the lock associated with the first thread is released. The spin loop is configured to repeatedly attempt the memory access operation and may pause between attempts. A failure is configured to continue the spin loop and a success is configured to exit the spin loop. Such spin loops consume processor cycles and/or may increase processor power consumption while waiting to successfully perform the memory access operation.

Generally, this disclosure relates to synchronization methods (and systems) for a computing device. The methods and systems are configured to identify spin loop(s) in a process executing on the computing device. The methods and systems are further configured to modify identified spin loop(s) at run-time using binary translation to mitigate effects of spin locks, e.g., to reduce consumption of processor resources.

As used herein, a process corresponds to an application executing on a processor and a thread corresponds to an instance of the process. A processor may include one or more execution core(s). The processor may be configured as one or more socket(s) that may each include one or more execution core(s).

A spin loop may be identified based, at least in part, on one or more of a detected hot function, a detected hot loop and/or a selected hot instruction. Execution of a detected hot function and/or a hot loop may consume processor resources greater than one or more threshold(s). Consumption of processor resources by a hot instruction may be high relative to other instructions included in the function and/or loop that includes the hot instruction. A hot function, hot loop and/or hot instruction may or may not be related to a spin loop.

A spin loop may include a pause instruction and/or a pause instruction and an atomic memory access instruction. Atomic memory access instructions may include, for example, <lock xchgl> configured to atomically exchange contents of a memory location and contents of a register; <lock cmpxchgl> ("compare and exchange (swap)", i.e., "CAS") configured to atomically compare a first source operand in a first register and a destination operand in a memory location, replace the destination operand with a second source operand in a second source register if the first source operand and destination operand are the same and replace the first source operand with the destination operand otherwise; <lock xadd> configured to swap a source operand and a destination operand and store the sum of the two operands in the destination operand; etc.

Execution of a function and/or a loop that includes a spin loop may be associated with a relatively high processor utilization (e.g., greater than 50%) and a relatively high fraction of instructions retired (e.g., greater than 50%). The relatively high processor utilization corresponds to consumption of processor resources while unable to successfully complete a desired operation, i.e., while waiting. Consuming processor resources while waiting may prevent another process and/or thread from executing and utilizing those processor resources to successfully perform desired operation(s).

Methods and systems consistent with the present disclosure are configured to monitor processor utilization and to determine a current processor utilization parameter (PUP). The current PUP may then be compared to a detection utilization threshold (UT). The current PUP and the detection UT each corresponds to a respective fraction of a maximum processor utilization. The current PUP may be determined for the processor (platform PUP), a socket (socket PUP) and/or a core (core PUP).

If the current PUP is greater than the detection UT, monitoring configured to detect hot function(s) and/or hot loop(s) may be initiated. Whether a function and/or a loop are hot may be determined based, at least in part, on acquired performance monitoring data and associated performance profiles (i.e., profile data), as described herein. Performance monitoring data includes processor utilization data and instructions retired data, as described herein. A hot loop may include a relatively small number of instructions. Thus, a hot loop may be detected further based, at least in part, on number of instructions in the loop.

For example, hot function(s) may be detected based, at least in part, on processor utilization data, instructions retired data and associated performance profile(s). In another example, hot loop(s) may be detected based, at least in part, on processor utilization data, instructions retired data, associated performance profile(s) and a number of instructions in each loop. Hot function(s) and hot loop(s) may then be analyzed to identify spin loop(s) based, at least in part, on processor utilization data, instructions retired data and the instructions included in the hot loop and/or hot function. In other words, processor utilization data and instructions retired data may provide an indication of a possible spin loop. Whether a hot function and/or a hot loop includes a spin loop may be determined based, at least in part, on further analysis of processor utilization data, instructions retired data and/or the instructions included in the hot loop and/or hot function. For example, a hot function that includes a pause instruction may include a spin loop if a PUP and an instructions retired parameter (IRP) associated with the pause instruction are each greater than a respective threshold and/or the hot function includes an atomic memory access instruction. In another example, a hot loop that includes a pause instruction may include a spin loop if a PUP and an IRP associated with the pause instruction are each greater than a respective threshold and/or the hot loop includes an atomic memory access instruction.

The methods and systems are configured to modify identified spin loop(s) using binary translation to reduce associated processor utilization. Binary translation is configured to operate on a binary code image, thus, access to source code is not required. In one embodiment, a spin loop may be modified to include a yield( ) function (i.e., system call) configured to cause the OS to select another process to execute, as described herein. In another embodiment, a spin loop may be modified to include exponential back-off, as described herein. The modified process portions (i.e., modified spin loops) may then be stored in memory. The target process may then be modified so that program flow proceeds (e.g., jumps) to the modified process portions and does not execute the original process portions.

Thus, hot function(s) and/or hot loop(s) may be detected at runtime based, at least in part, on acquired processor performance monitoring data and associated performance profiles (i.e., performance profile data). Spin loop(s) may be identified, also at run time based, at least in part, on instruction(s) included in the hot loop and/or hot function. Spin loop(s) may then be modified using binary translation to reduce processor utilization and the target process may be configured to execute a modified process portion corresponding to the binary translation of the spin loop. Processor utilization may thus be reduced dynamically at runtime without user intervention. Processor throughput may be improved by reducing a number of lock contentions. Processor utilization and associated power consumption may be similarly reduced. A method and system consistent with the present disclosure is configured to provide such improvements without requiring access to source code. The implementation is configured to be transparent to a user and may not be dependent on a priori knowledge of system workload and/or processor configuration. Overall performance may thus be improved.

FIG. 1 illustrates a system block diagram of a computing device 100 consistent with several embodiments of the present disclosure. Computing device 100 may include, but is not limited to, a server, a workstation computer, a desktop computer, a laptop computer, a tablet computer (e.g., iPad®, GalaxyTab® and the like), an ultraportable computer, an ultramobile computer, a netbook computer and/or a subnotebook computer; a mobile telephone including, but not limited to a smart phone, (e.g., iPhone®, Android®-based phone, Blackberry®, Symbian®-based phone, Palm®-based phone, etc.) and/or a feature phone.

Computing device 100 includes a processor 102, a chipset 104, input/output (I/O) port(s) 106, peripheral devices 108 and memory 110. Memory 110 may include a kernel space 112 and a user space 114. Processor 102 includes one or more execution core(s) $120a, \ldots, 120p$, a plurality of registers 122 and one or more cache memor(ies) 124. Processor 102 may include a memory management unit (MMU) 126 configured to manage memory accesses between processor 102 and memory 110. In some embodiments, processor 102 may be configured as one or more socket(s) $103a, \ldots, 103m$ and each socket, e.g., socket 103a, may include one or more core(s) $120a, \ldots, 120p$, a plurality of registers 122 and one or more cache memor(ies) 124. Each core $120a, \ldots, 120p$ may be configured to execute one or more process(es) and/or one or more thread(s). The plurality of registers 122 may include a plurality of general purpose registers, a status register and an instruction pointer. Cache(s) 124 may include one or more cache memories.

Chipset 104 is configured to couple processor 102 to peripheral devices 108 and I/O ports 106. For example, chipset 104 may include a peripheral controller hub (PCH). In another example, chipset 104 may include a sensors hub. Peripheral devices 108 may include, for example, user interface device(s) including a display, a touch-screen display, printer, keypad, keyboard, etc., sensor(s) including accelerometer, global positioning system (GPS), gyroscope, etc., communication logic, wired and/or wireless, storage device(s) including hard disk drives, solid-state drives, removable storage media, etc. I/O ports 106 may be configured to transmit and/or receive commands and/or data according to one or more communications protocols. For example, one or more of the I/O ports 106 may comply and/or be compatible with a universal serial bus (USB) protocol, as described herein. In another example, one or more of the I/O ports 106 may comply or be compatible with a peripheral component interconnect (PCI) protocol (e.g., PCI express (PCIe)), as described herein.

Memory 110 is configured to store one or more process(es) 130. Process(es) 130 may be stored in the user space 114. Process(es) 130 (i.e., executing application(s)) include a target process 132 and may include one or more other process(es) $131a, \ldots, 131n$. One or more of process(es) 130 may be configured to execute generally in parallel, i.e., as a plurality of processes and/or a plurality of threads. The target process 132 corresponds to one example of an executing application. The target process 132 may be executed as a plurality of threads.

Memory 110 is further configured to store an operating system (OS) 134 and/or a kernel 136. The OS 134 and/or kernel 136 may be stored in the kernel space 112. In some embodiments, the OS 134 may include the kernel 136. Target process 132 may be unable to directly access kernel space 112. In other words, OS 134 and/or kernel 136 may be configured to protect the kernel space 112 and to prevent access by target process 132 and/or other process(es) $131a, \ldots, 131n$.

The kernel 136 is configured to provide an interface between user processes and circuitry associated with computing device 100. In other words, the kernel 136 is configured to manage access to processor 102, chipset 104, I/O ports 106 and peripheral devices 108 by process(es) 130 including target process 132. Kernel 136 may include one or more drivers configured to manage and/or communicate with elements of computing device 100 (i.e., processor 102, chipset 104, I/O ports 106 and peripheral devices 108).

Memory 110 is configured to store a kernel performance monitor driver logic 140 and a performance monitor logic 142. In some embodiments, the kernel performance monitor driver logic 140 may be included in kernel 136. In some embodiments, the performance monitor logic 142 may be included in kernel performance monitor driver logic 140. Performance monitor logic 142 is configured to monitor operation of processor 102 and/or core(s) 120 and to acquire performance monitoring data, as described herein. The performance monitor logic 142 may be further configured to associate performance monitoring data with a socket, core, process and/or thread. The performance monitoring data may be stored in memory 110 in monitor and profile data 144.

For example, performance monitor logic 142 may correspond to a Performance Monitor Unit (PMU) configured to implement event sampling capability within a target process, e.g., target process 132. Events may include a count of a number of processor cycles, a count of a number of instructions retired, etc. A PMU may be configured to monitor operation of a processor, e.g., processor 102, and to capture a number of processor cycles and/or a number of instructions retired in a time interval. The number of processor cycles is related to processor utilization, as described herein.

In another example, performance monitor logic 142 may correspond to an application programming interface (API) configured to monitor and/or profile one or more process(es). Such APIs may include or be included in, for example, Intel® VTune® (a performance profiler), "OProfile" (an open source set of performance monitoring tools for Linux 2.6 and higher systems), "perf" (an open source profile tool for Linux 2.6 and higher), Oracle®Solaris Studio performance analysis tools, etc.

Performance monitor logic 142 and/or kernel performance monitor driver logic 140 may be configured to monitor operation of processor 102. Performance monitor logic 142 and/or kernel performance monitor driver logic 140 may be configured to compare a platform PUP to a detection UT. If the platform PUP reaches or exceeds the detection UT, kernel performance monitor driver logic 140 is configured to initiate detection of hot function(s) and/or hot loop(s). The platform PUP and detection UT correspond to a total utilization of processor 102 as a percentage of maximum allowable utilization of processor 102. The platform PUP is configured to include contributions from all of the associated processing units (e.g., socket(s) and/or core(s)). The detection UT may be stored in memory 110 in, for example, performance threshold data 146. The performance threshold values may be set by a user, e.g., a system administrator, generally prior to runtime. For example, the detection UT may be in the range of 70% to 100%. In one example, the detection UT may be 70%.

The platform PUP and detection UT are configured to provide an indication that an executing process may include a spin loop. A platform PUP greater than the detection UT is configured to trigger, i.e., initiate, further monitoring to detect hot function(s) and/or hot loop(s) and identify spin loop(s). For example, kernel performance monitor driver logic 140 may be configured to inject a monitor thread logic 143 into a target process. The monitor thread logic 143 is configured to periodically acquire (i.e., detect and/or capture) performance monitoring data and to store the performance monitoring data in monitor and profile data 144. For example, monitor thread logic 143 may capture performance monitoring data from performance monitor logic 142. In another example, monitor thread logic 143 may detect performance monitoring data directly.

Performance monitoring data includes processor utilization data and instructions retired data. Processor utilization data corresponds a current processor utilization. For example, processor utilization data may correspond to a number of processor cycles in a time interval. Instructions retired data corresponds to a number of instructions that have completed and commit. Each instruction may include a plurality of sub-operations, e.g., decode, fetch, execute, etc. As used herein, "retired" means that all of the sub-operations of an associated instruction have been performed successfully and retired from the processor pipeline. Performance monitoring data may be acquired over a time interval. Performance monitoring data may be acquired for a processor, e.g., processor 102, a socket, e.g., socket 103a, a core, e.g., core 120a. A process, a thread, a function and/or a loop may be identified and associated with respective performance monitoring data stored in monitor and profile data 144.

Kernel performance monitor driver logic 140 is configured to generate one or more performance profile(s) based, at least in part, on the acquired performance monitoring data. Performance profiles (i.e., performance profile data) may be generated for the processor 102, a socket, e.g., socket 103a, a core, e.g., core 120a, a process, e.g., target process 132, and/or a thread and may then be related to a function, a loop and/or an instruction. Performance profiles may include one or more PUP(s) and one or more IRP(s). Performance profiles may be stored in monitor and profile data 144. Kernel performance monitor driver logic 140 is configured to associate the PUP(s) and IRP(s) with a process, e.g., target process 132, and store the PUP(s) and IRP(s) in profile data 144.

A PUP (processor utilization parameter) corresponds to a ratio of processor utilization data values expressed, for example, as a percentage. Each processor utilization data value may be determined as a number of processor cycles executed over a time interval. A PUP may be determined for a target process relative to platform processor utilization, a function relative to a process that includes the function, an instruction relative to a function that includes the instruction, etc. Thus, a thread PUP corresponds processor cycles associated with a thread relative to a maximum number of processor cycles for the processor, a socket or a core. A function PUP corresponds to a fraction of processor cycles for a function relative to a total number of processor cycles for a process (and/or thread) that includes the function. A loop PUP corresponds to a fraction of processor cycles for a loop relative to a total number of processor cycles for a process (and/or thread) that includes the loop. A function loop PUP corresponds to a fraction of processor cycles for a loop relative to a total number of processor cycles for a function that includes the loop. An instruction PUP corresponds to a fraction of processor cycles for an instruction relative to a total number of processor cycles for a function and/or a loop that includes the instruction. For example, a pause instruction PUP and a pause instruction UT may be associated with a pause instruction.

Similarly, an IRP (instructions retired parameter) corresponds to a ratio of instructions retired data values expressed, for example, as a percentage. Thus, a loop IRP corresponds to a fraction of instructions retired for a loop relative to a total number of instructions retired for a process (and/or thread) that includes the loop. A function IRP corresponds to a fraction of instructions retired for a function relative to a total number of instructions retired for a process (and/or thread) that includes the function. A function loop IRP corresponds to a fraction of instructions retired for a loop relative to a total number of instructions retired for a function that includes the loop. An instruction IRP corresponds to a fraction of instructions retired for an instruction relative to a total number of instructions retired for a function and/or a loop that includes the instruction. For example, a pause instruction IRP may be associated with a pause instruction.

Performance profile(s) may be utilized to detect hot function(s) and/or hot loop(s) and to then identify spin loop(s). The hot function(s) and/or hot loop(s) may be detected based, at least in part, on one or more of the PUP(s) for a target process. For example, the PUP(s) may be compared to respective processor UT(s) for the target process. The hot function(s) and/or hot loop(s) may be detected based, at least in part, on one or more of the IRP(s) for a target process. For example, the IRP(s) may be compared to respective instructions retired threshold(s) (IRT(s)) for the target process. Spin loop(s) may be identified based, at least in part, on one or more of the PUP(s), one or more of the IRP(s) and on detection of a pause instruction included the hot function and/or hot loop, as described herein.

A hot function may correspond to a function with an associated function PUP greater than a function UT and a hot loop may correspond to a loop with an associated loop PUP greater than a loop UT. The hot function may be further analyzed to detect any hot loops that may be included in the hot function. The function UT corresponds to a function processor utilization fraction (e.g., percent) and the loop UT corresponds to a loop processor utilization fraction. For example, the function UT may be in the range of 20% to 100% and the loop UT may be in the range of 20% to 100%. For example, the function UT may be 20%. In another example, the loop UT may be 20%. The function UT and the loop UT may be set a priori and stored in performance threshold data 146. The thresholds may be adjusted and/or updated to improve accuracy.

Performance threshold data 146 may be further configured to store one or more IRT(s) and an instruction threshold. IRTs include a loop IRT that corresponds to a loop instructions retired fraction (e.g., percentage) and a function IRT that corresponds to a function instructions retired fraction. The IRTs may be determined relative to a total number of instructions retired in a time interval for a process that includes the function and/or the loop. For example, the loop IRT may be in the range 20% to 100% and the function IRT may be in the range 20% to 100%. For example, the loop IRT may be 20%. In another example, the function IRT may be 20%.

Similar to the UTs, the IRTs may be set a priori and adjusted and/or updated. In some embodiments, a function loop UT and/or a function loop IRT may be stored in performance threshold data 146. The function loop thresholds are configured to allow analysis of hot loops relative to hot functions that include the hot loops. For example, analyzing hot loops relative to the hot functions may provide a cross-check of hot function and hot loop detection and/or identification of spin loop(s).

The instruction threshold is related to a maximum number of instructions in a hot loop. A hot loop that includes a spin loop may typically include a relatively small number of instructions. For example, a maximum number of instructions may correspond to an order of magnitude of 100. For example, the instruction threshold may be 200. In another example, the instruction threshold may be less than 200. In another example, the instruction threshold may be greater than 200. The instruction threshold may be set a priori and stored in performance threshold data 146. The instruction threshold may be adjusted and/or updated.

Thus, in response to a platform processor utilization greater than the detection threshold, kernel performance monitor driver logic 140 is configured to detect hot function(s) and/or hot loop(s) for a socket, core, process and/or thread.

Kernel performance monitor driver logic 140 is configured to detect hot function(s) and/or hot loop(s) based, at least in part, on profile data 144 and performance threshold data 146. Kernel performance monitor driver logic 140 may be configured to compare one or more PUP(s) with respective processor UT(s) and/or to compare one or more IRP(s) with respective IRT(s) for each function and/or loop included in the target process. Kernel performance monitor driver logic 140 may be further configured to determine a number of instructions included in each loop. The number of instructions may then be compared to the instruction threshold by, e.g., kernel performance monitor driver logic 140. For example, a hot function may correspond to a function that has an associated function PUP greater than or equal to the function UT and an associated function IRP greater than or equal to the function IRT. For example, a hot loop may correspond to a loop that has an associated loop PUP greater than or equal to the loop UT and an associated loop IRP greater than or equal to the loop IRT and a number of instructions less than or equal to an instruction threshold.

Performance threshold data 146 may be further configured to store an instruction UT and an instruction IRT. For example, the instruction UT and/or the instruction IRT may be in the range of 20% to 100%. In one example, the instruction UT and the instruction IRT may each be 20%. Both the instruction UT and the instruction IRT correspond to ratios of instruction processor utilization and/or instructions retired data relative to function (and/or loop) processor utilization and/or instructions retired data for the function (and/or loop) that includes the instruction. These thresholds may be set a priori and may be adjusted and/or updated.

Kernel performance monitor driver logic 140 is further configured to identify spin loop(s) based, at least in part, on the detected hot function(s) and the detected hot loop(s). For each detected hot function and each detected hot loop, kernel performance monitor driver logic 140 may be configured to detect hot instructions. A hot instruction is an instruction that has a high instruction PUP and a high instruction IRP relative to other instruction(s) included in the hot loop and/or hot function. Thus, one or more hot instructions may be selected in a hot function and/or a hot loop. The hot instruction(s) may be selected by selecting the instruction(s) that have relatively high instruction PUPs and/or relatively high instruction IRPs in the hot function and/or hot loop. For example, 3 or 4 hot instructions may be selected. Kernel performance monitor driver logic 140 may then be configured to determine whether the selected hot instruction(s) include a pause instruction.

For example, spin loop(s) may include a pause instruction that has an associated pause instruction PUP greater than the pause instruction UT and an associated pause instruction IRP greater than the pause instruction IRT. In another example, spin loop(s) may include a pause instruction and an atomic memory access instruction. Thus, spin loop(s) may be identified based, at least in part, on performance monitoring data, performance profile(s), performance threshold data, number of instructions in a loop and the instructions included in the hot function(s) and/or hot loop(s). For example, the pause instruction UT may be in the range of 1% to 100% and/or the pause instruction IRT may be in the range of 1% to 100%. In one example, the pause instruction UT and IRT may each be 10%.

In some embodiments, kernel performance monitor driver logic 140 may be configured to compare spin loop(s) identified from hot function(s) to spin loop(s) identified from hot loop(s). Such a comparison is configured to provide a cross-check. For example, a hot function may include a hot loop that includes a spin loop. In another example, a hot loop may include a hot function that includes a spin loop. In other words, a spin loop may be identified both from a hot function and a hot loop.

Thus, methods (and systems) consistent with the present disclosure are configured to monitor platform processor utilization and to initiate detection of hot functions and/or hot loops if the platform processor utilization is greater than or equal to a detection threshold. The methods and systems are further configured to identify spin loop(s) in a target process (e.g., target process 132) based, at least in part, on performance monitoring data acquired during operation of, for example, computing device 100. Performance profile(s) may be created based, at least in part, on the performance monitoring data. Spin loop(s) may then be identified for the target process 132 without access to associated source code. The identified spin loop(s) may then be modified, as described herein.

Memory 110 further includes binary translator logic 148. Kernel performance monitor driver 140 is configured to inject binary translator logic 148 into a target process, e.g., target process 132, to modify each identified spin loop to reduce at least the respective loop PUP. Each modified spin loop may then correspond to a respective modified code portion, e.g., modified process portion 152 that includes binary translator logic 148. Binary translator logic 148 is configured to operate on a binary code image, e.g., target process 132, thus, access to source code is not required. In one embodiment, a spin loop may be modified to include a yield( ) function configured to cause the OS to select another process, e.g., one or more of process(es) 131a, . . . , 131n, to execute. Yielding is configured to allow another process to execute while the target process 132 is waiting for a lock to be released, thus, reducing processor cycles and, thereby, processor utilization associated with waiting. The modified spin loop may be configured to yield after a predefined number of passes through the spin loop. In another embodiment, a spin loop may be modified to include exponential back-off. In exponential back-off, each iteration through the spin loop may pause for an increasing duration. Exponential back-off is configured to reduce both processor utilization and fraction of instructions retired in a time period by pausing for an increasing portion of the time period.

The modified process portion(s) 152 (i.e., modified spin loop(s)) including binary translator logic 148 may then be stored in memory 110. Kernel performance monitor driver logic 140 may be configured to allocate a memory portion configured to store the modified process portion(s) 152 and binary translator logic 148. For example, the memory portion may be included in user space 114 in a logical address space allocated to the target process 132. In another example, the memory portion may be included in a protected address space 115 not visible to other processes 131a, . . . , 131n. Utilizing the protected address space 115 is configured to preserve security of computing device 110.

The target process 132 may then be modified so that program flow proceeds (e.g., jumps) to the modified process portion(s) 152 and does not execute the unmodified spin loop(s). For example, the binary translator logic 148 may be configured to implement redirection from the unmodified spin loop(s) to respective modified process portion(s). Modifications to the target process 132 may be performed atomically. In other words, in a multi-threaded situation execution of the modified process portion(s) 152 may not be initiated for one thread without also configuring other threads to execute the modified process portion(s) 152.

Binary translation may introduce additional operations and related control flows (e.g., jumps). As a result, contents of one or more general register(s) 122 should be preserved when a modified process portion 152 is entered and restored when the modified process portion 152 is exited. The binary translator logic 148 may be configured to perform such register preservation and restoration operations.

A yield( ) function is one example of a system call, i.e., a function call to an OS for service. When source code is compiled and linked to generate executable (i.e., binary) code, a linker is typically responsible for linking user-generated code to, for example, system library routines. In binary translation, binary translator logic, e.g., binary translator logic 148, is configured to provide linking functionality. For example, binary translator logic 148 may be configured to determine a location (e.g., an address) of a selected library routine linked with the target process 132. In this example, the selected library routine may correspond to the yield( ) function. In another example, the binary translator logic 148 may be configured to implement a wrapper function configured to initiate the system call, e.g., yield( ).

Thus, hot function(s) and/or hot loop(s) may be detected at runtime based, at least in part, on acquired processor performance monitoring data and associated performance profiles. Spin loop(s) may then be identified based, at least in part, on instruction(s) included in the hot loop(s) and/or hot function(s). Identified spin loop(s) may then be modified using binary translation to reduce processor utilization and the target process may be configured to execute the respective binary translation of each spin loop (i.e., modified process portion) rather than the unmodified spin loop. Processor utilization may thus be reduced dynamically at runtime without user intervention. Processor throughput may be improved by reducing a number of lock contentions. Processor utilization and associated power consumption may be similarly reduced. A method and system consistent with the present disclosure is configured to provide such improvements without requiring access to source code. The implementation is configured to be transparent to a user and may not be dependent on system workload and/or processor configuration. Overall performance may thus be improved.

Figure 2:
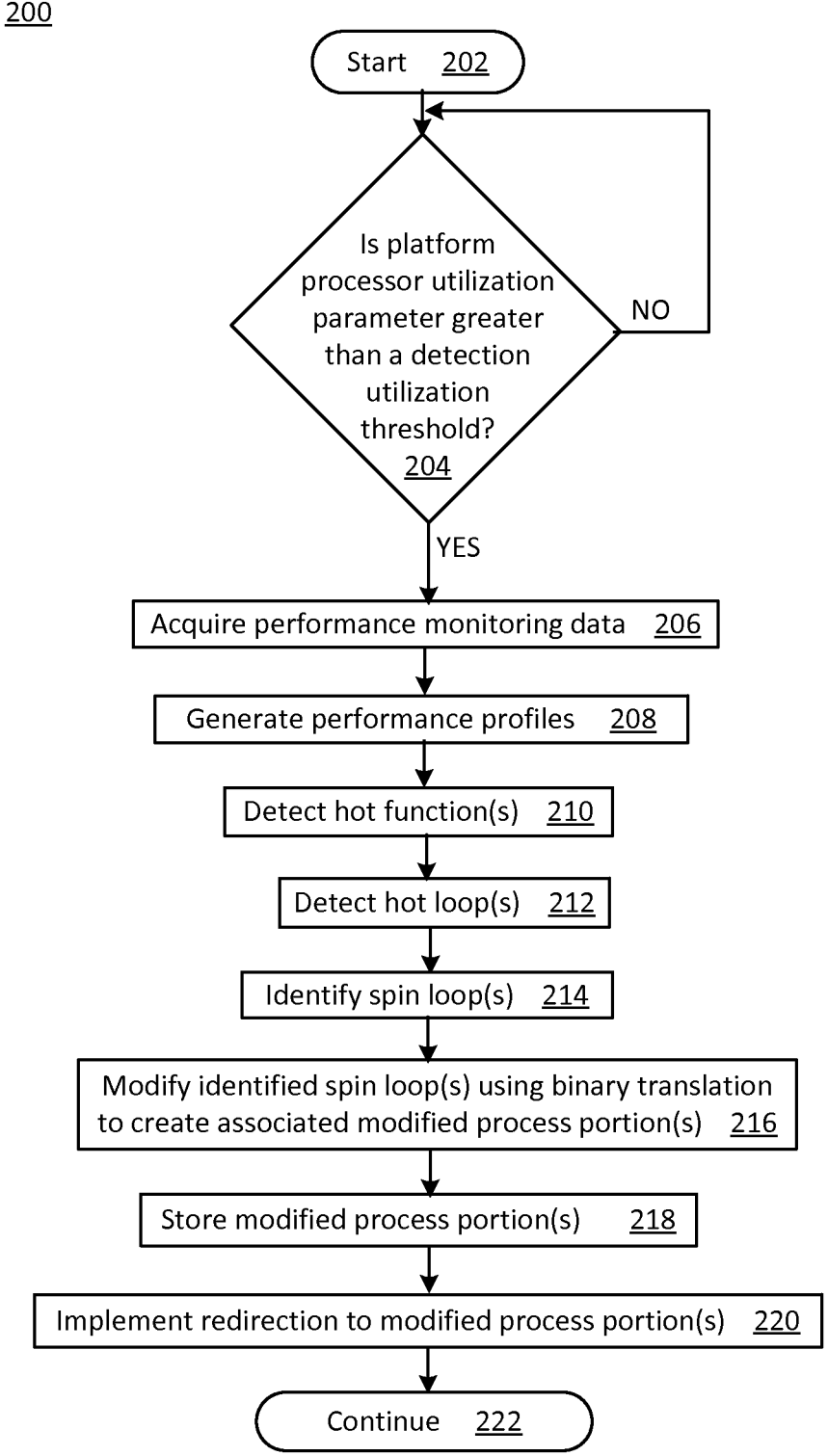
FIG. 2 is a flowchart of synchronization operations according to various embodiments of the present disclosure.

FIG. 2 is a flowchart 200 of synchronization operations according to various embodiments of the present disclosure. In particular, the flowchart 200 illustrates detecting processor utilization above a threshold, detecting hot function(s) and/or hot loop(s), identifying spin loop(s) and modifying the spin loop(s) to improve processor utilization. The operations may be performed, for example, by computing device 100, in particular, kernel performance monitor driver logic 140, performance monitor logic 142, monitor thread logic 143 and/or binary translator logic 148 of FIG. 1.

Operations of this embodiment may begin with start 202. Whether processor utilization is greater than a detection threshold may be determined at operation 204. For example, processor utilization may correspond to platform processor utilization, i.e., platform PUP. If the platform PUP is not greater than the detection threshold, program flow may repeat operation 204. If the platform PUP is greater than the detection threshold, performance monitoring data may be acquired at operation 206. The performance monitoring data may include processor utilization data and/or instructions retired data. Performance profiles (i.e., performance profile data) may be generated at operation 208. Generating the performance profile(s) may include relating the performance monitoring data to a target process. Hot function(s) may be detected at operation 210. Hot loop(s) may be detected at operation 212. Hot function(s) and/or hot loop(s) may be detected by comparing PUP(s) to respective UT(s) and/or by comparing IRP(s) to respective IRT(s). Spin loop(s) may be identified at operation 214. Operation 216 includes modifying the identified spin loop(s) using binary translation to create associated modified process portion(s). The modified process portions are configured to reduce processor utilization that may be associated with the spin loop(s). The modified process portion(s) may be stored at operation 218. For example, the modified process portion(s) may be stored in memory, e.g., in user space. Operation 220 may include implementing redirection to the modified process portion(s). Redirection is configured to cause the modified process portion(s) to be executed instead of the unmodified spin loop(s). Program flow may then continue at operation 222.

Thus, detection of hot function(s) and/or hot loop(s) may be initiated in response to processor utilization greater than a detection threshold. For example, lock contentions may increase processor utilization when one thread unsuccessfully attempts to access a memory location that another thread has locked. Spin loop(s) may be identified related to the hot function(s) and hot loop(s). Identified spin loop(s) may then be modified using binary translation to reduce processor utilization associated with the lock contention and a target process may be modified to execute the modified process portion(s) rather than the associated spin loop(s). Processor utilization may thus be improved.

Figure 3:
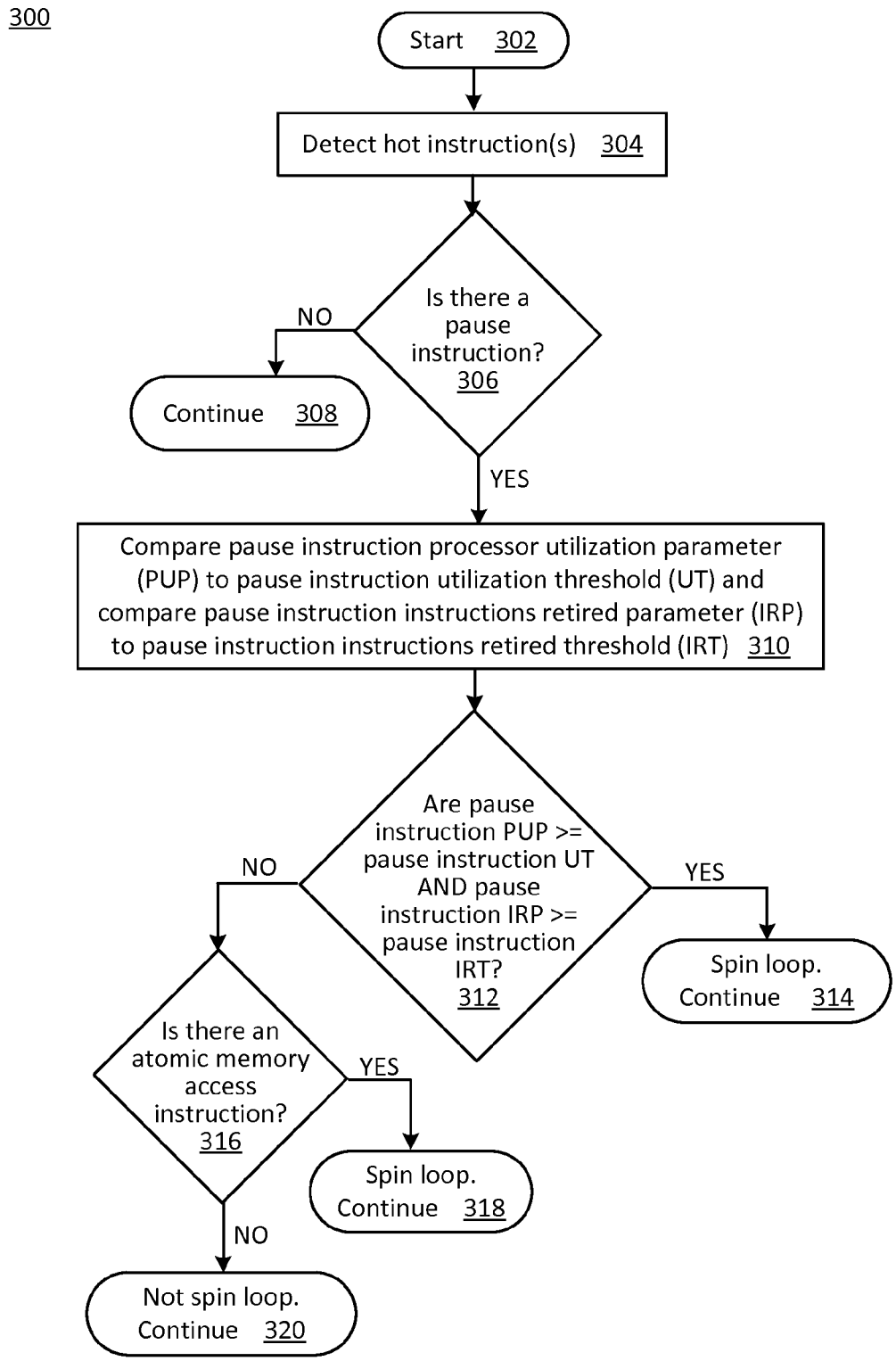
FIG. 3 is a flowchart of spin loop identification operations according to various embodiments of the present disclosure.

FIG. 3 is a flowchart 300 of spin loop identification operations according to various embodiments of the present disclosure. In particular, flowchart 300 illustrates one example of operation 214 of FIG. 2. The operations may be performed, for example, by computing device 100, in particular, kernel performance monitor driver logic 140 of FIG. 1. Operations of this embodiment may be performed for each hot function and/or hot loop detected in operations 210 and 212 of FIG. 2.

Operations of this embodiment may begin with start 302. Hot instruction(s) may be detected at operation 304. For example, performance profile(s), i.e., performance profile data, for detected hot function(s) and/or detected hot loop(s) may be analyzed. Instruction(s) that have a relatively high associated instruction PUP and/or a relatively high associated instruction IRP may correspond to hot instructions. For example, one or more hot instructions may be detected within a hot function and/or a hot loop by selecting the instruction(s) that have the high instruction PUPs and/or the high instruction IRPs in the hot function and/or hot loop. "High" may be determined relative to other instruction(s) in the hot function and/or hot loop. The instruction PUP(s) and instruction IRP(s) may be determined with respect to the hot function and/or hot loop that includes the instruction(s).

Whether the hot instruction(s) include a pause instruction may be determined at operation 306. If the hot instruction(s) do not include a pause instruction, then program flow may continue at operation 308. The absence of a pause instruction in the hot instructions may indicate that the corresponding hot function and/or hot loop likely do not include a spin loop. If the hot instruction(s) include a pause instruction, a pause instruction PUP may be compared to a pause instruction UT and a pause instruction IRP may be compared to a pause instruction IRT at operation 310. Whether the pause instruction PUP is greater than the pause instruction UT and the pause instruction IRP is greater than the pause instruction IRT may be determined at operation 312. If both conditions of operation 312 are true, then the pause instruction is associated with a spin loop and program flow may continue at operation 314. If at least one of the conditions of operation 312 is not true, then whether the hot instruction(s) include an atomic memory access instruction may be determined at operation 316. If the hot instruction(s) include an atomic memory access instruction, then the corresponding hot function and/or hot loop include a spin loop and program flow may continue at operation 318. If the hot instruction(s) do not include an atomic memory access instruction, then the corresponding hot function and/or hot loop do not include an actual hot loop and program flow may continue at operation 320.

Thus, hot instruction(s) included in hot function(s) and/or hot loop(s) may be analyzed to identify spin loop(s). Spin loop(s) are associated with spin-lock, as described herein. A pause instruction and performance profile data greater than or equal to associated thresholds corresponds to a spin loop. The pause instruction and an atomic memory access instruction correspond to a spin loop. Identified spin loop(s) may then be modified to mitigate effects of spin-lock, as described herein.

While the flowcharts of FIGS. 2 and 3 illustrate operations according various embodiments, it is to be understood that not all of the operations depicted in FIGS. 2 and 3 are necessary for other embodiments. In addition, it is fully contemplated herein that in other embodiments of the present disclosure, the operations depicted in FIGS. 2 and/or 3, and/or other operations described herein may be combined in a manner not specifically shown in any of the drawings, and such embodiments may include less or more operations than are illustrated in FIGS. 2 and/or 3. Thus, claims directed to features and/or operations that are not exactly shown in one drawing are deemed within the scope and content of the present disclosure.

In a first usage example, an Intel® Xeon® processor configured as 2 sockets and 8 cores per socket, executing a database application (database process) with no other applications executing, was monitored as described herein. Platform PUP was detected to be near 100% and monitoring for detection of hot function(s) and/or hot loop(s) and identification of spin loop(s) was initiated. A hot loop was detected that had an associated loop PUP of 89.2% and an associated loop IRT of 27.5%. The hot loop further included fewer than 200 instructions. The hot loop was included in a hot function. The hot function had an associated function PUP of 96% and an associated function IRP of 44%. Further analysis determined that the hot function included a pause instruction and an atomic memory access instruction (<lock xchgl>). The pause instruction had a pause instruction PUP of 1% and a pause instruction IRP of 11%. The atomic instruction had an associated instruction PUP of 91% and an associated instruction IRP of 51%. For both instructions, the percentages were determined relative to respective parameters for the hot function.

Continuing with this usage example, pseudocode for this hot function included:

```
For (;;)
{
if (tryLock))
   break;
pause ( );
}
``` thus, including a spin loop. The hot function and spin loop were modified using binary translation to include a yield( ) function, as described herein. The resulting pseudocode then included:

```
For (retries=0;;)
{
if (tryLock))
   break;
else if (retries<N)
   pause( )
   retries++;
```

```
    else
       yield( )
       retries=0;
    }
```
Thus, rather than continuing to consume processor resources while waiting, the yield( ) system call was configured to allow another process and/or thread to execute while the hot function was waiting for a lock to be released.

In a second usage example, an Intel® Xeon® processor configured as 4 sockets and 10 cores per socket executing a Business Intelligence application, was monitored as described herein. Platform PUP was detected to be near 100% and monitoring for detection of hot function(s) and/or hot loop(s) and identification of spin loop(s) was initiated. A hot function was detected that had an associated function PUP of 43% and an associated function IRP of 47%. Hot instruction analysis of the hot function revealed four instructions with a combined instruction PUP of 84% and a combined instruction IRP of 98% with respect to the hot function. The four hot instructions included a pause instruction that had a pause instruction PUP of 49% and pause instruction IRP of 98%. Pseudo-code of the spin loop included:

```
    do
    {
    PROCESSOR PAUSE;
    Spin_Count++;
    }
    while ([text condition] && [Spin_Count<Spin_Limit]);
```
Thus, the pause instruction was related to a spin loop.

In a third usage example, an Intel® Xeon® processor configured as 4 sockets and 10 cores per socket executing a database application, was monitored as described herein. Platform PUP was detected to be near 100% and monitoring for detection of hot function(s) and/or hot loop(s) and identification of spin loop(s) was initiated. A hot function was detected that had an associated function PUP of 32% and an associated function IRP of 26%. Hot instruction analysis of the hot function revealed three instructions with a combined instruction PUP of 99% and a combined instruction IRP of near 100% with respect to the hot function. The three hot instructions included a pause instruction that had a pause instruction PUP of 64% and a pause instruction IRP of near 100%. Pseudo-code of the spin loop included:

```
    while (Node→Bblocked)
    {
    PROCESSOR PAUSE;
    }
```
Thus, the pause instruction was related to a spin loop.

In a fourth usage example, an Intel® Xeon® processor configured as 2 sockets and 8 cores per socket executing a database application, was monitored as described herein. Platform PUP was detected to be near 100% and monitoring for detection of hot function(s) and/or hot loop(s) and identification of spin loop(s) was initiated. A hot function was identified that had an associated function PUP of 36% and an associated function IRP of 21%. Hot instruction analysis of the hot function revealed three instructions with a combined instruction PUP of 70% and a combined instruction IRP of 72% with respect to the hot function. The three hot instructions included a pause instruction that had a pause instruction PUP of 25% and pause instruction IRP of 19%. Pseudo-code of the spin loop included:

```
    Loop {
    if (latch held)
       then {if CAS( ) succeeds, then exit;}
    PROCESSOR PAUSE;
    }
```

In the pseudo-code, CAS( ) corresponds to <lock cmpxchgl>, i.e., an atomic compare and exchange instruction, as described herein.

While the pause instruction PUP was greater than the pause instruction UT (e.g., 20%), the pause instruction IRP was 19% which is slightly less than the pause instruction IRT (e.g., 20%). The hot function includes an atomic memory access instruction (<lock cmpxchgl>), thus the hot function includes a spin loop, as described herein Thus, methods and systems consistent with the present disclosure may be configured to detect hot loop(s) and/or hot function(s). The methods and systems are further configured to identify spin loop(s) based, at least in part, on the hot loop(s) and/or hot function(s). The methods and systems may be further configured to modify identified spin loop(s) using binary translation to reduce, for example, processor utilization associated with the spin loop(s).

OS 134 may be configured to manage system resources and control tasks that are run on each respective device and/or system, e.g., computing device 100. For example, the OS may be implemented using Microsoft Windows, HP-UX, Linux, or UNIX, although other operating systems may be used. In some embodiments, the OS may be replaced by a virtual machine monitor (or hypervisor) which may provide a layer of abstraction for underlying hardware to various operating systems (virtual machines) running on one or more processing units, e.g., core(s) 120a, . . . , 120p.

Memory 110 may include one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory may include other and/or later-developed types of computer-readable memory.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

USB (Universal serial bus) may comply or be compatible with Universal Serial Bus Specification, Revision 2.0, published by the Universal Serial Bus organization, Apr. 27, 2000, and/or later versions of this specification, for example, Universal Serial Bus Specification, Revision 3.1, published Jul. 26, 2013.

PCIe may comply or be compatible with PCI Express 3.0 Base specification, Revision 3.0, published by Peripheral Component Interconnect Special Interest Group (PCI-SIG), November 2010, and/or later and/or related versions of this specification.

As used in any embodiment herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The logic may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

Thus, consistent with the teachings of the present disclosure, a system and method include kernel performance monitor driver logic and binary translator logic configured to detect hot loop(s) and/or hot function(s), to identify spin loop(s) and to modify the identified spin loop(s) to improve processor utilization. Hot function(s) and/or hot loop(s) may be detected and spin loop(s) may be identified at runtime based, at least in part, on acquired processor performance monitoring data and associated performance profiles. Identified spin loop(s) may then be modified using binary translation to reduce processor utilization and the target process may be configured to execute the binary translation of the spin loop (i.e., modified process portion). Processor utilization may thus be reduced dynamically at runtime without user intervention. Processor throughput may be improved by reducing a number of lock contentions. A method and system consistent with the present disclosure is configured to provide such improvements without requiring access to source code. The implementation is configured to be transparent to a user and may not be dependent on a priori knowledge of system workload and/or processor configuration.

EXAMPLES

Examples of the present disclosure include subject material such as a method, means for performing acts of the method, a device, or of an apparatus or system related to a synchronization in a computing device, as discussed below.

Example 1

According to this example there is provided an apparatus. The apparatus includes a processor to execute a process, a chipset, a memory to store the process, and logic. The processor includes one or more core(s). The logic is to acquire performance monitoring data in response to a platform processor utilization parameter (PUP) greater than a detection utilization threshold (UT), identify a spin loop based, at least in part, on at least one of a detected hot function and/or a detected hot loop, modify the identified spin loop using binary translation to create a modified process portion, and implement redirection from the identified spin loop to the modified process portion.

Example 2

This example includes the elements of example 1, wherein the at least one of the detected hot function and/or the detected hot loop is detected based, at least in part, on one or more performance profile(s) related to the performance monitoring data.

Example 3

This example includes the elements of example 1, wherein the identified spin loop is identified based, at least in part, on a pause instruction.

Example 4

This example includes the elements of example 1, wherein the performance monitoring data includes at least one of processor utilization data and instructions retired data.

Example 5

This example includes the elements of example 2, wherein the performance profile(s) are selected from the group including a function processor utilization parameter (PUP), a loop PUP, an instruction PUP, a function instructions retired parameter (IRP), a loop IRP and an instruction IRP.

Example 6

This example includes the elements according to any one of examples 1 through 5, wherein the detected hot function is detected based, at least in part, on a function processor utilization parameter (PUP) and a function instructions retired parameter (IRP).

Example 7

This example includes the elements according to any one of examples 1 through 5, wherein the detected hot loop is detected based, at least in part, on a loop processor utilization parameter (PUP) and a loop instructions retired parameter (IRP).

Example 8

This example includes the elements of example 7, wherein the detected hot loop is detected based, at least in part, on a number of instructions in the detected hot loop.

Example 9

This example includes the elements according to any one of examples 1 through 5, wherein the detected hot function is detected based, at least in part, on a comparison of a function processor utilization parameter (PUP) and a function utilization threshold (UT) and a comparison of a function instructions retired parameter (IRP) and a function instructions retired threshold (IRT).

Example 10

This example includes the elements according to any one of examples 1 through 5, wherein the detected hot loop is detected based, at least in part, on a comparison of a loop processor utilization parameter (PUP) and a loop utilization threshold (UT) and a comparison of a loop instructions retired parameter (IRP) and a loop instructions retired threshold (IRT).

Example 11

This example includes the elements of example 10, wherein the detected hot loop is detected based, at least in part, on a comparison of a number of instructions included in the detected hot loop to an instruction threshold.

Example 12

This example includes the elements according to any one of examples 1 through 5, wherein the detected hot function has an associated function processor utilization parameter (PUP) greater than or equal to a function utilization threshold (UT) and a function instructions retired parameter (IRP) greater than or equal to a function instructions retired threshold (IRT).

Example 13

This example includes the elements according to any one of examples 1 through 5, wherein the detected hot loop has an associated loop processor utilization parameter (PUP) greater than or equal to a loop utilization threshold (UT) and a loop instructions retired parameter (IRP) greater than or equal to a loop instructions retired threshold (IRT).

Example 14

This example includes the elements of example 13, wherein a number of instructions in the detected hot loop is less than or equal to an instruction threshold.

Example 15

This example includes the elements of example 9 or 12, wherein the function UT is in the range of 20 percent (%) to 100 percent and the function IRT is in the range of 20% to 100%.

Example 16

This example includes the elements according to any one of examples 10, 11, 13 and 14, wherein the loop UT is in the range of 20 percent (%) to 100 percent, the loop IRT is in the range of 20% to 100%.

Example 17

This example includes the elements of example 11 or 14, wherein the instruction threshold is on the order of 100.

Example 18

This example includes the elements according to any one of examples 10, 11, 13 and 14, wherein the loop UT is 20%, the loop IRT is 20% and the instruction threshold is 200.

Example 19

This example includes the elements of example 11 or 14, wherein the instruction threshold is 200.

Example 20

This example includes the elements according to any one of examples 1 through 5, wherein the logic is further to select one or more hot instructions for each of the detected hot function and the detected hot loop.

Example 21

This example includes the elements of example 20, wherein each hot instruction is selected based, at least in part, on a respective instruction processor utilization parameter (PUP) and based, at least in part, on a respective instruction instructions retired parameter (IRP).

Example 22

This example includes the elements of example 21, wherein each respective instruction PUP and each respective instruction IRP is determined relative to the detected hot function or the detected hot loop.

Example 23

This example includes the elements of example 20, wherein each of the one or more selected hot instructions has at least one of a high instruction processor utilization parameter (PUP) and/or a high instruction instructions retired parameter (IRP) relative to other instructions in the detected hot function or the detected hot loop.

Example 24

This example includes the elements of example 20, wherein a number of selected hot instructions is 3 or 4.

Example 25

This example includes the elements of example 20, wherein the logic is further to determine whether the one or more selected hot instructions includes a pause instruction.

Example 26

This example includes the elements according to any one of examples 1 through 5, wherein the identified spin loop includes a pause instruction that has an associated pause instruction processor utilization parameter (PUP) greater than or equal to a pause instruction utilization threshold (UT) and an associated pause instruction instructions retired parameter (IRP) greater than or equal to a pause instruction instructions retired threshold (IRT).

Example 27

This example includes the elements according to any one of examples 1 through 5, wherein the identified spin loop includes a pause instruction and an atomic memory access instruction.

Example 28

This example includes the elements of example 26, wherein the pause instruction UT is in the range of 20 percent (%) to 100% and the pause instruction IRT is in the range of 20% to 100%.

Example 29

This example includes the elements of example 26, wherein the pause instruction UT is 20 percent (%) and the pause instruction IRT is 20%.

Example 30

This example includes the elements of example 2, wherein the detected hot function is related to the detected hot loop.

Example 31

This example includes the elements according to any one of examples 1 through 5, wherein the modified process portion includes at least one of a yield system call or an exponential back-off operation

Example 32

This example includes the elements according to any one of examples 1 through 5, wherein the logic is further to allocate a memory portion in the memory, the memory portion to store the modified process portion.

Example 33

This example includes the elements of example 32, wherein the memory includes a user space and a kernel space and the allocated memory portion is included in the user space.

Example 34

This example includes the elements of example 32, wherein the memory includes a user protected address space and the allocated memory portion is included in the user protected address space.

Example 35

This example includes the elements of example 4, wherein the processor utilization data corresponds to a current processor utilization and the instructions retired data corresponds to a number of instructions that have completed and commit.

Example 36

This example includes the elements of example 35, wherein the current processor utilization corresponds to a number of processor cycles in a first time interval and the instructions retired data corresponds to a number of instructions that have completed and commit in a second time interval.

Example 37

This example includes the elements of example 2, wherein the logic is further to generate the one or more performance profile(s).

Example 38

This example includes the elements of example 2, wherein the one or more performance profile(s) include at least one of a processor utilization parameter (PUP) and an instructions retired parameter (IRP).

Example 39

This example includes the elements of example 38, wherein the PUP corresponds to a ratio of processor utilization data values and the IRP corresponds to a ratio of instructions retired data values

Example 40

This example includes the elements of example 2, wherein the one or more performance profile(s) include a loop processor utilization parameter (PUP) and a loop instructions retired parameter (IRP).

Example 41

This example includes the elements of example 2, wherein the one or more performance profile(s) include a function processor utilization parameter (PUP) and a function instructions retired parameter (IRP).

Example 42

This example includes the elements according to any one of examples 1 through 5, wherein the spin loop is included in both the detected hot function and the detected hot loop.

Example 43

This example includes the elements according to any one of examples 1 through 5, wherein the memory includes a user space and a kernel space and the logic is to store the modified process portion in the user space.

Example 44

This example includes the elements according to any one of examples 1 through 5, wherein the detection utilization threshold (UT) is in the range of 20 percent (%) to 100%.

Example 45

This example includes the elements according to any one of examples 1 through 5, wherein the detection utilization threshold (UT) is 70 percent.

Example 46

According to this example there is provided a method. The method includes executing, by a processor comprising one or more core(s), a process. The method further includes acquiring, by monitor thread logic, performance monitoring data in response to a platform processor utilization parameter (PUP) greater than a detection utilization threshold (UT); identifying, by kernel performance monitor driver logic, a spin loop based, at least in part, on at least one of a detected hot function and/or a detected hot loop; modifying, by binary translator logic, the identified spin loop using binary translation to create a modified process portion; and implementing, by the binary translator logic, redirection from the identified spin loop to the modified process portion.

Example 47

This example includes the elements of example 46, further including detecting, by the kernel performance monitor driver logic, at least one of the detected hot function and/or the detected hot loop based, at least in part, on one or more performance profile(s) related to the performance monitoring data.

Example 48

This example includes the elements of example 46, wherein the identified spin loop is identified based, at least in part, on a pause instruction.

Example 49

This example includes the elements of example 46, wherein the performance monitoring data includes at least one of processor utilization data and instructions retired data.

Example 50

This example includes the elements of example 47, wherein the performance profile(s) are selected from the group including a function processor utilization parameter (PUP), a loop PUP, an instruction PUP, a function instructions retired parameter (IRP), a loop IRP and an instruction IRP.

Example 51

This example includes the elements according to any one of examples 46 through 50, further including detecting, by kernel performance monitor driver logic, the detected hot function based, at least in part, on a function processor utilization parameter (PUP) and a function instructions retired parameter (IRP).

Example 52

This example includes the elements according to any one of examples 46 through 50, further including detecting, by kernel performance monitor driver logic, the detected hot loop based, at least in part, on a loop processor utilization parameter (PUP) and a loop instructions retired parameter (IRP).

Example 53

This example includes the elements of example 52, wherein the detected hot loop is detected based, at least in part, on a number of instructions in the detected hot loop.

Example 54

This example includes the elements according to any one of examples 46 through 50, further including detecting, by kernel performance monitor driver logic, the detected hot function based, at least in part, on a comparison of a function processor utilization parameter (PUP) and a function utilization threshold (UT) and a comparison of a function instructions retired parameter (IRP) and a function instructions retired threshold (IRT).

Example 55

This example includes the elements according to any one of examples 46 through 50, further including detecting, by kernel performance monitor driver logic, the detected hot loop based, at least in part, on a comparison of a loop processor utilization parameter (PUP) and a loop utilization threshold (UT) and a comparison of a loop instructions retired parameter (IRP) and a loop instructions retired threshold (IRT).

Example 56

This example includes the elements of example 55, wherein the detected hot loop is detected based, at least in part, on a comparison of a number of instructions included in the detected hot loop to an instruction threshold.

Example 57

This example includes the elements according to any one of examples 46 through 50, wherein the detected hot function has an associated function processor utilization parameter (PUP) greater than or equal to a function utilization threshold (UT) and a function instructions retired parameter (IRP) greater than or equal to a function instructions retired threshold (IRT).

Example 58

This example includes the elements according to any one of examples 46 through 50, wherein the detected hot loop has an associated loop processor utilization parameter (PUP) greater than or equal to a loop utilization threshold (UT) and a loop instructions retired parameter (IRP) greater than or equal to a loop instructions retired threshold (IRT).

Example 59

This example includes the elements of example 58, wherein a number of instructions in the detected hot loop is less than or equal to an instruction threshold.

Example 60

This example includes the elements of example 54 or 57, wherein the function UT is in the range of 20 percent (%) to 100 percent and the function IRT is in the range of 20% to 100%.

Example 61

This example includes the elements according to any one of examples 55, 56, 58 and 59, wherein the loop UT is in the range of 20 percent (%) to 100 percent, the loop IRT is in the range of 20% to 100%.

Example 62

This example includes the elements of example 56 or 59, wherein the instruction threshold is on the order of 100.

Example 63

This example includes the elements according to any one of examples 55, 56, 58 and 59, wherein the loop UT is 20%, the loop IRT is 20% and the instruction threshold is 200.

Example 64

This example includes the elements of example 56 or 59, wherein the instruction threshold is 200.

Example 65

This example includes the elements according to any one of examples 46 through 50, further including selecting, by kernel performance monitor driver logic, one or more hot instructions for each of the detected hot function and the detected hot loop.

Example 66

This example includes the elements of example 65, wherein each hot instruction is selected based, at least in part, on a respective instruction processor utilization parameter (PUP) and based, at least in part, on a respective instruction instructions retired parameter (IRP).

Example 67

This example includes the elements of example 66, wherein each respective instruction PUP and each respective instruction IRP is determined relative to the detected hot function or the detected hot loop.

Example 68

This example includes the elements of example 65, wherein each of the one or more selected hot instructions has at least one of a high instruction PUP and/or a high instruction IRP relative to other instructions in the detected hot function or the detected hot loop.

Example 69

This example includes the elements of example 65, wherein a number of selected hot instructions is 3 or 4.

Example 70

This example includes the elements of example 65, further including determining, by kernel performance monitor driver logic, whether the one or more selected hot instructions includes a pause instruction.

Example 71

This example includes the elements according to any one of examples 46 through 50, wherein the identified spin loop includes a pause instruction that has an associated pause instruction processor utilization parameter (PUP) greater than or equal to a pause instruction utilization threshold (UT) and an associated pause instruction instructions retired parameter (IRP) greater than or equal to a pause instruction instructions retired threshold (IRT).

Example 72

This example includes the elements according to any one of examples 46 through 50, wherein the identified spin loop includes a pause instruction and an atomic memory access instruction.

Example 73

This example includes the elements of example 71, wherein the pause instruction UT is in the range of 20 percent (%) to 100% and the pause instruction IRT is in the range of 20% to 100%.

Example 74

This example includes the elements of example 71, wherein the pause instruction UT is 20 percent (%) and the pause instruction IRT is 20%.

Example 75

This example includes the elements of example 47, wherein the detected hot function is related to the detected hot loop.

Example 76

This example includes the elements according to any one of examples 46 through 50, wherein the modified process portion includes at least one of a yield system call or an exponential back-off operation.

Example 77

This example includes the elements according to any one of examples 46 through 50, further including allocating, by kernel performance monitor driver logic, a memory portion in a memory, the memory portion to store the modified process portion.

Example 78

This example includes the elements of example 77, wherein the memory includes a user space and a kernel space and the allocated memory portion is included in the user space.

Example 79

This example includes the elements of example 77, wherein the memory includes a user protected address space and the allocated memory portion is included in the user protected address space.

Example 80

This example includes the elements of example 49, wherein the processor utilization data corresponds to a current processor utilization and the instructions retired data corresponds to a number of instructions that have completed and commit.

Example 81

This example includes the elements of example 80, wherein the current processor utilization corresponds to a number of processor cycles in a first time interval and the instructions retired data corresponds to a number of instructions that have completed and commit in a second time interval.

Example 82

This example includes the elements of example 47, further including generating, by kernel performance monitor driver logic, the one or more performance profile(s).

Example 83

This example includes the elements of example 47, wherein the one or more performance profile(s) include at least one of a processor utilization parameter (PUP) and an instructions retired parameter (IRP).

Example 84

This example includes the elements of example 83, wherein the PUP corresponds to a ratio of processor utilization data values and the IRP corresponds to a ratio of instructions retired data values.

Example 85

This example includes the elements of example 47, wherein the one or more performance profile(s) include a loop processor utilization parameter (PUP) and a loop instructions retired parameter (IRP).

Example 86

This example includes the elements of example 47, wherein the one or more performance profile(s) include a function processor utilization parameter (PUP) and a function instructions retired parameter (IRP).

Example 87

This example includes the elements according to any one of examples 46 through 50, wherein the spin loop is included in both the detected hot function and the detected hot loop.

Example 88

This example includes the elements according to any one of examples 46 through 50, further including storing, by kernel performance monitor driver logic, the modified process portion in a user space of a memory that includes the user space and a kernel space.

Example 89

This example includes the elements according to any one of examples 46 through 50, wherein the detection utilization threshold (UT) is in the range of 20 percent (%) to 100%.

Example 90

This example includes the elements according to any one of examples 46 through 50, wherein the detection utilization threshold (UT) is 70 percent.

Example 91

According to this example there is provided a computer readable storage device having stored thereon instructions that when executed by one or more processors result in the following operations including executing a process; acquiring performance monitoring data in response to a platform processor utilization parameter (PUP) greater than a detection utilization threshold (UT); identifying a spin loop based, at least in part, on at least one of a detected hot function and/or a detected hot loop; modifying the identified spin loop using binary translation to create a modified process portion; and implementing redirection from the identified spin loop to the modified process portion.

Example 92

This example includes the elements of example, wherein 91, wherein the instructions that when executed by one or more processors results in the following additional operations including detecting at least one of the detected hot function and/or the detected hot loop based, at least in part, on one or more performance profile(s) related to the performance monitoring data.

Example 93

This example includes the elements of example 91, wherein the identified spin loop is identified based, at least in part, on a pause instruction.

Example 94

This example includes the elements of example 91, wherein the performance monitoring data comprises at least one of processor utilization data and instructions retired data.

Example 95

This example includes the elements of example 92, wherein the performance profile(s) are selected from the group including a function processor utilization parameter (PUP), a loop PUP, an instruction PUP, a function instructions retired parameter (IRP), a loop IRP and an instruction IRP.

Example 96

This example includes the elements according to any one of examples 91 through 95, wherein the instructions that when executed by one or more processors results in the following additional operations including detecting the detected hot function based, at least in part, on a function processor utilization parameter (PUP) and a function instructions retired parameter (IRP).

Example 97

This example includes the elements according to any one of examples 91 through 95, wherein the instructions that when executed by one or more processors results in the following additional operations including detecting the detected hot loop based, at least in part, on a loop processor utilization parameter (PUP) and a loop instructions retired parameter (IRP).

Example 98

This example includes the elements of example 97, wherein the detected hot loop is detected based, at least in part, on a number of instructions in the detected hot loop.

Example 99

This example includes the elements according to any one of examples 91 through 95, wherein the instructions that when executed by one or more processors results in the following additional operations including detecting the detected hot function based, at least in part, on a comparison of a function processor utilization parameter (PUP) and a function utilization threshold (UT) and a comparison of a function instructions retired parameter (IRP) and a function instructions retired threshold (IRT).

Example 100

This example includes the elements according to any one of examples 91 through 95, wherein the instructions that when executed by one or more processors results in the following additional operations including detecting the detected hot loop based, at least in part, on a comparison of a loop processor utilization parameter (PUP) and a loop utilization threshold (UT) and a comparison of a loop instructions retired parameter (IRP) and a loop instructions retired threshold (IRT).

Example 101

This example includes the elements of example 100, wherein the detected hot loop is detected based, at least in part, on a comparison of a number of instructions included in the detected hot loop to an instruction threshold.

Example 102

This example includes the elements according to any one of examples 91 through 95, wherein the detected hot function has an associated function processor utilization parameter (PUP) greater than or equal to a function utilization threshold (UT) and a function instructions retired parameter (IRP) greater than or equal to a function instructions retired threshold (IRT).

Example 103

This example includes the elements according to any one of examples 91 through 95, wherein the detected hot loop has an associated loop processor utilization parameter (PUP) greater than or equal to a loop utilization threshold (UT) and a loop instructions retired parameter (IRP) greater than or equal to a loop instructions retired threshold (IRT).

Example 104

This example includes the elements of example 103, wherein a number of instructions in the detected hot loop is less than or equal to an instruction threshold.

Example 105

This example includes the elements according to any one of examples 99 or 102, wherein the function UT is in the range of 20 percent (%) to 100 percent and the function IRT is in the range of 20% to 100%.

Example 106

This example includes the elements according to any one of examples 100, 101, 103 and 104, wherein the loop UT is in the range of 20 percent (%) to 100 percent, the loop IRT is in the range of 20% to 100% t.

Example 107

This example includes the elements according to any one of examples 101 or 104, wherein the instruction threshold is on the order of 100.

Example 108

This example includes the elements according to any one of examples 100, 101, 103 and 104, wherein the loop UT is 20%, the loop IRT is 20% and the instruction threshold is 200.

Example 109

This example includes the elements according to any one of examples 101 or 104, wherein the instruction threshold is 200.

Example 110

This example includes the elements according to any one of examples 91 through 95, wherein the instructions that when executed by one or more processors results in the following additional operations including selecting one or more hot instructions for each of the detected hot function and the detected hot loop.

Example 111

This example includes the elements of example 110, wherein each hot instruction is selected based, at least in part, on a respective instruction processor utilization parameter (PUP) and based, at least in part, on a respective instruction instructions retired parameter (IRP).

Example 112

This example includes the elements of example 111, wherein each respective instruction PUP and each respective instruction IRP is determined relative to the detected hot function or the detected hot loop.

Example 113

This example includes the elements of example 110, wherein each of the one or more selected hot instructions has at least one of a high instruction PUP and/or a high instruction IRP relative to other instructions in the detected hot function or the detected hot loop.

Example 114

This example includes the elements of example 110, wherein a number of selected hot instructions is 3 or 4.

Example 115

This example includes the elements of example 110, wherein the instructions that when executed by one or more processors results in the following additional operations including determining whether the one or more selected hot instructions comprises a pause instruction.

Example 116

This example includes the elements according to any one of examples 91 through 95, wherein the identified spin loop comprises a pause instruction that has an associated pause instruction processor utilization parameter (PUP) greater than or equal to a pause instruction utilization threshold (UT) and an associated pause instruction instructions retired parameter (IRP) greater than or equal to a pause instruction instructions retired threshold (IRT).

Example 117

This example includes the elements according to any one of examples 91 through 95, wherein the identified spin loop comprises a pause instruction and an atomic memory access instruction.

Example 118

This example includes the elements of example 116, wherein the pause instruction UT is in the range of 1 percent (%) to 100% and the pause instruction IRT is in the range of 1% to 100%.

Example 119

This example includes the elements of example 116, wherein the pause instruction UT is 10 percent (%) and the pause instruction IRT is 10%.

Example 120

This example includes the elements of example 92, wherein the detected hot function is related to the detected hot loop.

Example 121

This example includes the elements according to any one of examples 91 through 95, wherein the modified process portion comprises at least one of a yield system call or an exponential back-off operation.

Example 122

This example includes the elements according to any one of examples 91 through 95, wherein the instructions that when executed by one or more processors results in the following additional operations including allocating a memory portion in a memory, the memory portion to store the modified process portion.

Example 123

This example includes the elements of example 122, wherein the memory comprises a user space and a kernel space and the allocated memory portion is included in the user space.

Example 124

This example includes the elements of example 122, wherein the memory comprises a user protected address space and the allocated memory portion is included in the user protected address space.

Example 125

This example includes the elements of example 94, wherein the processor utilization data corresponds to a current processor utilization and the instructions retired data corresponds to a number of instructions that have completed and commit.

Example 126

This example includes the elements of example 125, wherein the current processor utilization corresponds to a number of processor cycles in a first time interval and the instructions retired data corresponds to a number of instructions that have completed and commit in a second time interval.

Example 127

This example includes the elements of example 92, wherein the instructions that when executed by one or more processors results in the following additional operations including generating the one or more performance profile(s).

Example 128

This example includes the elements of example 92, wherein the one or more performance profile(s) include at least one of a processor utilization parameter (PUP) and an instructions retired parameter (IRP).

Example 129

This example includes the elements of example 128, wherein the PUP corresponds to a ratio of processor utilization data values and the IRP corresponds to a ratio of instructions retired data values.

Example 130

This example includes the elements of example 92, wherein the one or more performance profile(s) comprise a loop processor utilization parameter (PUP) and a loop instructions retired parameter (IRP).

Example 131

This example includes the elements of example 92, wherein the one or more performance profile(s) comprise a function processor utilization parameter (PUP) and a function instructions retired parameter (IRP).

Example 132

This example includes the elements according to any one of examples 91 through 95, wherein the spin loop is included in both the detected hot function and the detected hot loop.

Example 133

This example includes the elements according to any one of examples 91 through 95, wherein the instructions that when executed by one or more processors results in the following additional operations including storing the modified process portion in a user space of a memory that comprises the user space and a kernel space.

Example 134

This example includes the elements according to any one of examples 91 through 95, wherein the detection utilization threshold (UT) is in the range of 70 percent (%) to 100%.

Example 135

This example includes the elements according to any one of examples 91 through 95, wherein the detection utilization threshold (UT) is 70 percent.

Example 136

According to this example there is a computer readable storage device having stored thereon instructions that when executed by one or more processors result in the following operations including the method according to any one of examples 46 through 90.

Example 137

Another example of the present disclosure is a system including at least one device arranged to perform the method of any one of examples 46 through 90.

Example 138

Another example of the present disclosure is a device including means to perform the method of any one of examples 46 through 90.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. An apparatus comprising:
a processor to execute a process, the processor comprising at least one or more core(s); a chipset;
a memory to store the process; and
logic to:
acquire performance monitoring data in response to a platform processor utilization parameter (PUP) greater than a detection utilization threshold (UT), wherein the performance monitoring data comprises at least one of processor utilization data and instructions retired data;
identify a spin loop associated with the process at least in part by identifying at least one of a detected hot function and/or a detected hot loop using the acquired performance monitoring data;
modify the identified spin loop using binary translation to create a modified process portion; and
implement redirection from the identified spin loop to the modified process portion.

2. The apparatus of claim 1, wherein the at least one of the detected hot function and/or the detected hot loop is identified based, at least in part, on one or more performance profile(s) related to the performance monitoring data.

3. The apparatus of claim 1, wherein the detected hot function has an associated function processor utilization parameter (PUP) greater than or equal to a function utilization threshold (UT) and a function instructions retired parameter (IRP) greater than or equal to a function instructions retired threshold (IRT), the detected hot loop has an associated loop PUP greater than or equal to a loop UT and a loop IRP greater than or equal to a loop IRT, and a number of instructions in the detected hot loop is less than or equal to an instruction threshold.

4. The apparatus of claim 3, wherein the function UT, the function IRT, the loop UT and the loop IRT are in the range of 20% to 100% and the instruction threshold is on the order of 100.

5. The apparatus of claim 1, wherein the logic is further to select one or more hot instructions for each of the detected hot function and the detected hot loop and each of the one or more selected hot instructions has at least one of a high instruction processor utilization parameter (PUP) and/or a high instruction instructions retired parameter (IRP) relative to other instructions in the detected hot function or the detected hot loop.

6. The apparatus of claim 1, wherein at least one of the identified spin loop comprises a pause instruction that has an associated pause instruction processor utilization parameter (PUP) greater than or equal to a pause instruction utilization threshold (UT) and an associated pause instruction instructions retired parameter (IRP) greater than or equal to a pause instruction instructions retired threshold (IRT) and/or the identified spin loop comprises a pause instruction and an atomic memory access instruction.

7. The apparatus of claim 1, wherein the modified process portion comprises at least one of a yield system call or an exponential back-off operation.

8. A method comprising:
executing, by a processor comprising one or more core(s), a process;
acquiring, by monitor thread logic, performance monitoring data in response to a platform processor utilization parameter (PUP) greater than a detection utilization threshold (UT), wherein the performance monitoring data comprises at least one of processor utilization data and instructions retired data;
identifying, by kernel performance monitor driver logic, a spin loop based, at least in part, on at least one of a detected hot function and/or a detected hot loop;
modifying, by binary translator logic, the identified spin loop using binary translation to create a modified process portion; and
implementing, by the binary translator logic, redirection from the identified spin loop to the modified process portion.

9. The method of claim 8, further comprising detecting, by the kernel performance monitor driver logic, at least one of the detected hot function and/or the detected hot loop based, at least in part, on one or more performance profile(s) related to the performance monitoring data.

10. The method of claim 8, wherein the detected hot function has an associated function processor utilization parameter (PUP) greater than or equal to a function utilization threshold (UT) and a function instructions retired parameter (IRP) greater than or equal to a function instructions retired threshold (IRT), the detected hot loop has an associated loop PUP greater than or equal to a loop UT and a loop IRP greater than or equal to a loop IRT and a number of instructions in the detected hot loop is less than or equal to an instruction threshold.

11. The method of claim 10, wherein the function UT, the function IRT, the loop UT and the loop IRT are in the range of 20% to 100% and the instruction threshold is on the order of 100.

12. The method of claim 8, further comprising selecting, by kernel performance monitor driver logic, one or more hot instructions for each of the detected hot function and the detected hot loop, wherein each of the one or more selected hot instructions has at least one of a high instruction PUP and/or a high instruction IRP relative to other instructions in the detected hot function or the detected hot loop.

13. The method of claim 8, wherein at least one of the identified spin loop comprises a pause instruction that has an associated pause instruction processor utilization parameter (PUP) greater than or equal to a pause instruction utilization threshold (UT) and an associated pause instruction instructions retired parameter (IRP) greater than or equal to a pause instruction instructions retired threshold (IRT) and/or the identified spin loop comprises a pause instruction and an atomic memory access instruction.

14. The method of claim 8, wherein the modified process portion comprises at least one of a yield system call or an exponential back-off operation.

15. A computer-readable storage device having stored thereon instructions that when executed by one or more processors result in the following operations comprising:
    executing a process;
    acquiring performance monitoring data in response to a platform processor utilization parameter (PUP) greater than a detection utilization threshold (UT), wherein the performance monitoring data comprises at least one of processor utilization data and instructions retired data;
    identifying a spin loop associated with the process, at least in part by identifying at least one of a detected hot function and/or a detected hot loop using the acquired performance monitoring data;
    modifying the identified spin loop using binary translation to create a modified process portion; and
    implementing redirection from the identified spin loop to the modified process portion.

16. The computer-readable storage device of claim 15, wherein identifying a spin loop associated with the process further comprises detecting at least one of the detected hot function and/or the detected hot loop based, at least in part, on one or more performance profile(s) related to the performance monitoring data.

17. The computer-readable storage device of claim 15, wherein the detected hot function has an associated function processor utilization parameter (PUP) greater than or equal to a function utilization threshold (UT) and a function instructions retired parameter (IRP) greater than or equal to a function instructions retired threshold (IRT), the detected hot loop has an associated loop PUP greater than or equal to a loop UT and a loop IRP greater than or equal to a loop IRT and a number of instructions in the detected hot loop is less than or equal to an instruction threshold.

18. The computer-readable storage device of claim 17, wherein the function UT, the function IRT, the loop UT and the loop IRT are in the range of 20% to 100% and the instruction threshold is on the order of 100.

19. The computer-readable storage device of claim 15, wherein the instructions that when executed by one or more processors results in the following additional operations comprising:
    selecting one or more hot instructions for each of the detected hot function and the detected hot loop, each of the one or more selected hot instructions having at least one of a high instruction PUP and/or a high instruction IRP relative to other instructions in the detected hot function or the detected hot loop.

20. The computer-readable storage device of claim 15, wherein at least one of the identified spin loop comprises a pause instruction that has an associated pause instruction processor utilization parameter (PUP) greater than or equal to a pause instruction utilization threshold (UT) and an associated pause instruction instructions retired parameter (IRP) greater than or equal to a pause instruction instructions retired threshold (IRT) and/or the identified spin loop comprises a pause instruction and an atomic memory access instruction.

21. The computer-readable storage device of claim 15, wherein the modified process portion comprises at least one of a yield system call or an exponential back-off operation.

* * * * *